Nov. 13, 1956

H. MOSES

2,770,128

ELECTRONIC PRESSURE DIFFERENTIAL
WIND DIRECTION INDICATOR

Filed Feb. 9, 1955

INVENTOR.
Harry Moses

BY
Roland A. Anderson
Attorney

United States Patent Office 2,770,128
Patented Nov. 13, 1956

2,770,128
ELECTRONIC PRESSURE DIFFERENTIAL WIND DIRECTION INDICATOR

Harry Moses, Park Forest, Ill., assignor to the United States of America as represented by the United States Atomic Energy Commission Application February 9, 1955, Serial No. 487,229

15 Claims. (Cl. 73—188)

This invention relates to automatic measuring apparatus, and more particularly, to instruments for measuring the direction of air flow.

Rotatably mounted mechanical wind vanes coupled by mechanical or electrical means to an indicator and in some instances to an automatic recording apparatus have long been widely used to measure wind direction. Mechanical wind vanes depend upon the force of the air flowing obliquely into a surface to position the vane in alignment with the direction of flow of the air. The rotational inertia of a wind vane mounted on bearings and adapted to actuate the indicating means is substantial. Accordingly, the high inertia characteristics of mechanical wind vanes limits their response to only gross variation in wind direction and completely masks small amplitude and high frequency wind direction fluctuations.

Vertical or elevational components of wind direction are a useful meteorological parameter and when considered by direct observation or when considered implicitly as a component of a three dimensional or total wind vector, constitute a measure of diffusion rates of contaminants in the atmosphere, atmospheric turbulence, and atmospheric stability. The conventional wind vane is limited as a practical device to measurement of only horizontal or azimuthal components of wind direction. Consequently the elevational wind component and the total three dimensional wind vector were prior to this invention measured infrequently and with little precision.

One object of the present invention is to provide an apparatus with low inertia characteristics for precise measurement of small amplitude and high frequency fluctuations in wind direction.

Another object of the present invention is to provide an apparatus readily adapted to measurement of vertical wind components and the total three dimensional wind vector.

Still another object of the present invention is to provide a sensitive apparatus not dependent on energy derived from the wind for measuring low velocity components of the total three dimensional wind direction.

The present invention comprises briefly an apparatus having in combination, a rotatably mounted member provided with two orifices, a chamber, a flexible membrane suspended within the chamber and dividing the chamber into two compartments, means for connecting each orifice to one compartment in the chamber, an electro-mechanical transducer responsive to movements of the membrane, a motor adapted to position the rotatably mounted member, and electronic means for actuating the motor in response to unequal pressure on the two sides of the membrane. When the orifices are positioned asymmetrically with respect to the wind direction, unequal pressures due to the dynamic effects of air flowing at different oblique angles over the orifices are induced in the means connecting the orifices and the chamber compartments, and in turn the regions of dynamically induced pressure are extended to include the chamber compartments. Consequently a pressure difference is developed between the two sides of the elastic membrane proportional to the relative angle of the wind vector and the position of the orifices. The electro-mechanical transducer detects deflection of the membrane caused by the pressure differential, and feeds an error signal into the electronic means which actuates the motor and positions the orifices symmetrically with respect to the wind direction. Automatic means are readily adapted to the motor shaft to continuously record movements of the motor and therewith a continuous record of wind direction.

Embodiments of the present invention are illustrated in the accompanying drawings, in which.

Figure 1:
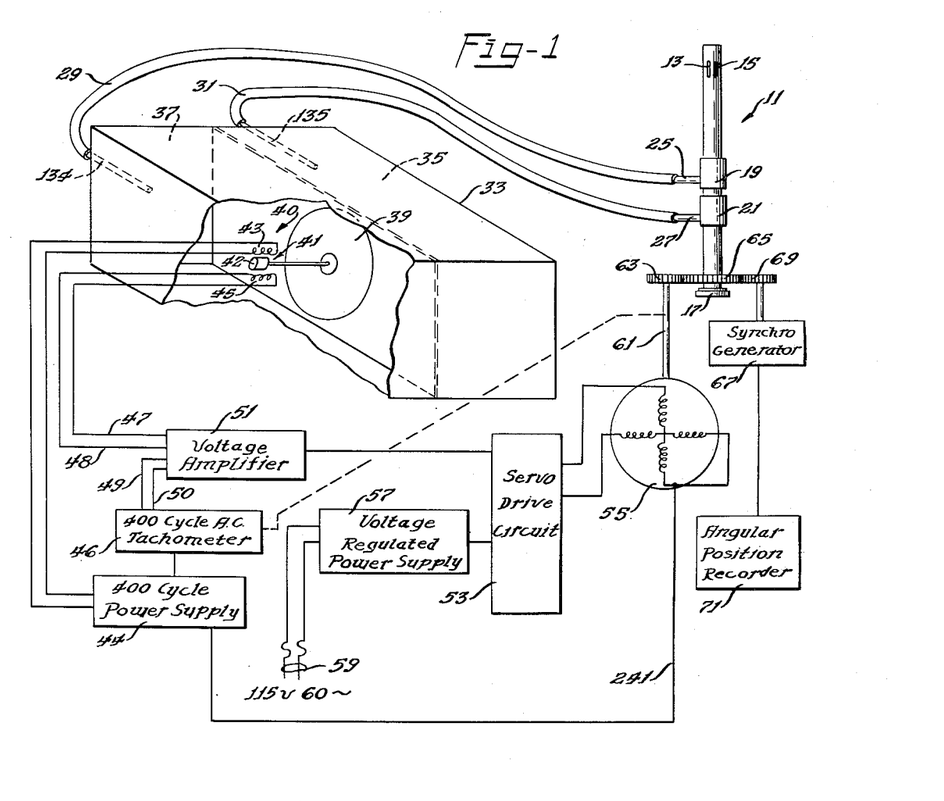
Fig. 1 is a schematic drawing illustrating the relationships between the component parts of the invention.

Referring to Fig. 1 in the drawings 11 represents a rotatably mounted cylindrical member having orifices 13 and 15 set 90° apart radially, the member being adapted to rotate on a bearing 17. Rotary port seals 19 and 21 connect the orifices 13 and 15 with fixed tubes 25 and 27. Hollow flexible tubes 29 and 31 connect the fixed tubes 25 and 27 of the rotary port seals 19 and 21 with the compartments 35 and 37 in the chamber 33. A flexible membrane or partition 39 is suspended in the chamber 33 and forms a common boundary between the compartments 35 and 37.

The electro-mechanical transducer 40 comprises a linear variable differential transformer 41 having a movable core 42 coupled to the membrane 39 by mechanical means described below. The transformer primary coil 43 is connected to a 400 cycle power supply 44, and the transformer secondary coil 45 is connected with leads 47, 48 to the input stage of a voltage amplifier 51. A 400 cycle tachometer damping signal is fed into the voltage amplifier 51 from a 400 cycle alternating current tachometer 46 connected electrically to the input stage of the voltage amplifier 51 by leads 49 and 50. The output of the voltage amplifier 51 is fed to a servo drive circuit 53, which powers and controls a motor 55. A power supply 57 is connected to a 115 volt 60 cycle mains 59 and powers the servo drive circuit 53.

The motor 55 is adapted to rotate the member 11 by means of a shaft 61 and gears 63 and 65. The shaft 61 is furthermore, coupled mechanically to the tachometer 46. A synchro-generator 67 is mounted to generate a signal in response to movements of the motor shaft 61 by means of a gear 69. The generated signal is fed into an angular position recorder 71.

Figures 2, 3:
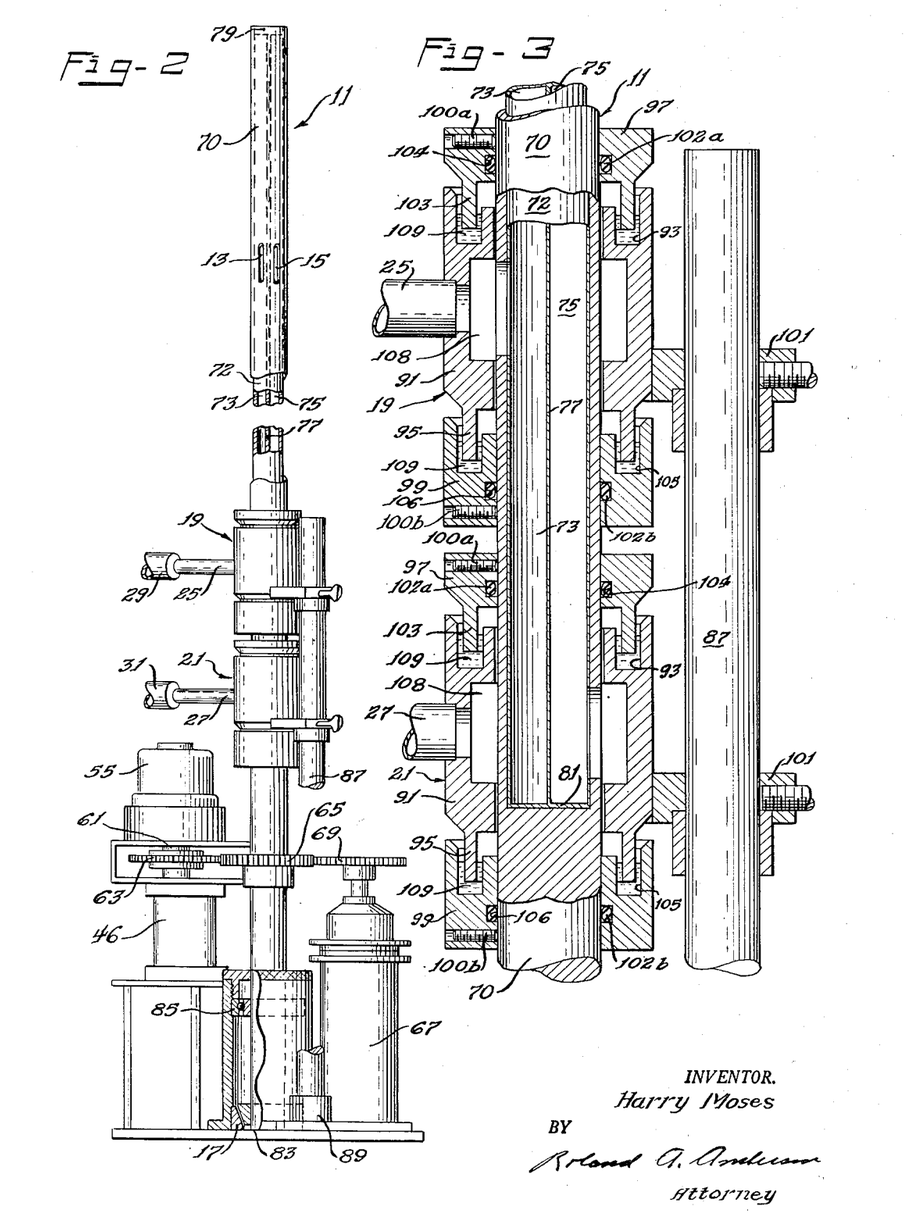
Fig. 2 is an elevational view partly in cross section of the rotatably mounted member and associated mechanical parts.
Fig. 3 is a sectional view of a rotary seal comprising a portion of the means for connecting the orifices with the chamber compartments.

Referring now to Fig. 2 the rotatably mounted member 11 is shown to consist of a hollow shaft 70 wherein is mounted a tube 72 having two separate air tight sections 73, 75, separated by an axial partition 77. The orifices 13 and 15 in the wall of tube 72 open internally, respectively, into sections 73 and 75 and open externally through the wall of the shaft 70. The orifices 13, 15 take the convenient form of slots of equal area and similar shape. The air tight sections 73, 75 are closed off at one end of the tube above the orifices 13, 15 by a transverse section 79 and below the rotary port seals 19 and 21 by a transverse section 81, illustrated in Fig. 3. The member 11 is mounted on a bearing 17 at one end 83 and further held by a sleeve bearing 85.

The rotary port seals 19 and 21 are shown in a sectional view in Fig. 3. These seals form an air tight pressure connection between the internal sections 73 and 75 of the rotatably mounted member 11 and the flexible tubes 29 and 31 leading to the compartments 35 and 37, respectively, of the chamber 33. The rotary port seals 19 and 21 each consist of three axially aligned annular members disposed about the rotatably mounted member 11 and interlocked, as will be described below, to form an air tight port seal capable of transmitting very small pressure changes from the rotating internal tube sections 73 and 75 to the flexible tubes 29 and 31. The rotary port seals 19 and 21 are further supported by a bracket 87 which is held rigidly in a base 89.

The rotary port seals 19 and 21 each consist of three main parts: a stationary sleeve 91 having an annular groove 93 at one end and an annular projecting section 95 at the other end, and two collars 97 and 99. The collars 97 and 99 rotate with the tube 72 and shaft 70 and clamp tightly about the shaft 70 by means of set screws 100a, 100b and O rings 102a and 102b set in recesses 104 and 106 in the collars 97 and 99 respectively. The stationary sleeve 91 is held clear of the shaft 70 by a bracket 101 which in turn is supported by a second bracket 87. The collar 97 is provided with a projecting annular section 103 which is adapted to fit well down into the annular groove 93 on the one end of the sleeve 91. And the collar 99 is provided with an annular groove 105 adapted to receive the annular projecting section 95 on the other end of the sleeve 91. A heavy viscous fluid 109, such as oil, is placed in the grooves 93 and 105 and forms freely rotatable air tight seals. Section 73 of the tube 72 opens into a cavity 108 within the sleeve member 91 of seal 19 which in turn is open to the fixed tube 25. Section 75 of the tube 72 opens into a cavity 108 of sleeve 91 in seal 21 and that in turn opens into fixed tube 27. The cavity 108 in the sleeve 91 of both rotary port seals 19 and 21 is annular shaped and provides an air passage from the respective sections 73, 75 of the tube 72 to the fixed tubes 25 and 27 regardless of the angular position of the tube 72.

Figure 13:
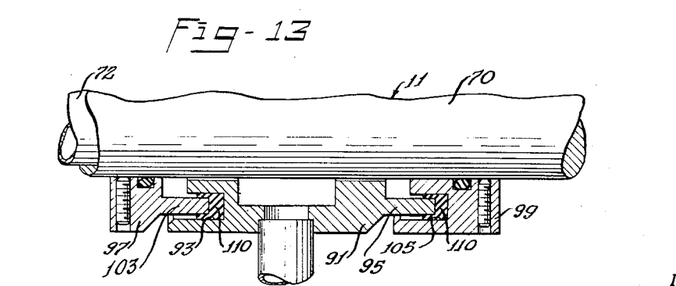
Fig. 13 is a sectional view of a rotary port seal adapted for use with moveable parts rotating about a horizontal axis.

When the vertical wind component is to be measured the rotation of the tube 72 must be about a horizontal axis. In order to form a rotary seal about a horizontal axis the grooves 93 and 105 are provided with precision machined oil impregnated bronze bearing liners 110, illustrated in a sectional view in Fig. 13. These liners 110 have sliding clearances with the complementary sections 95, 103 of only a few thousandths of an inch, and are readily substituted for the viscous fluid seals 109 described above. Rotary seals employing oil impregnated bronze bearing liners 110 maintain pressure for a sufficiently long period for the proper functioning of the apparatus and do not add an excessive frictional drag to movement of the rotatably mounted member 11.

Figure 4:
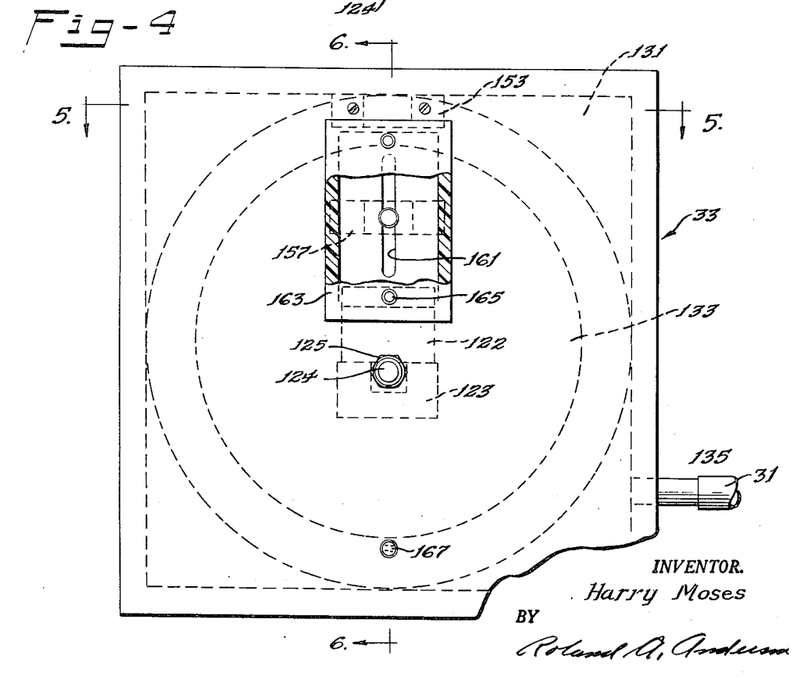
Fig. 4 is an elevational view of the chamber.
Figure 5:
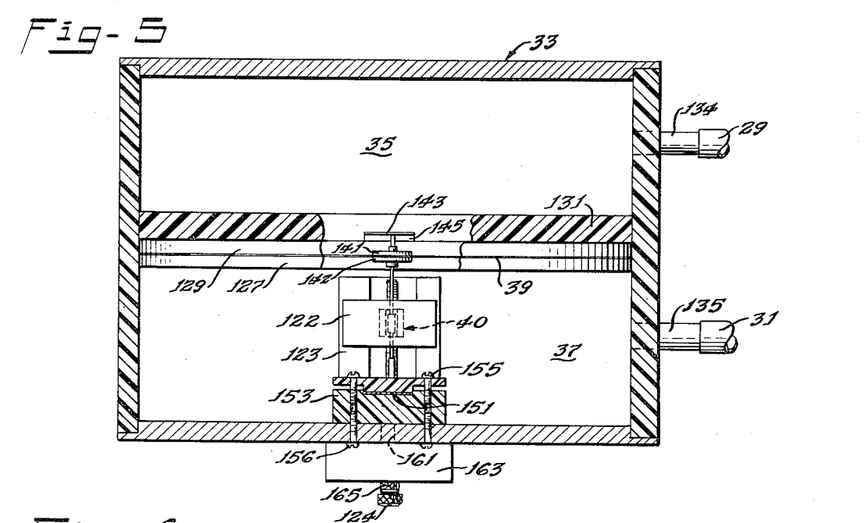
Fig. 5 is a sectional view of the chamber taken on line 5—5 of Fig. 4.

Fig. 4 is an elevational view of the air tight chamber 33 separated into two compartments 35 and 37 by the membrane 39. The compartments are best illustrated in Fig. 5, which is a sectional view taken on line 5—5 of Fig. 4. The membrane may be a thin, flexible material impermeable to air, such as cellulose acetate plastic, mica, Phosphor bronze, stainless steel, or "Invar" steel, an alloy described below. In the particular construction shown the membrane 39 is made of .002 inch thick cellulose acetate plastic, available commercially under the trade name "Tenite 1," and has an effective diameter of 8 inches. The membrane 39 is held by a set of two rings 127 and 129 which are mounted to a partition 131 which is provided with a large opening in the middle 133. The rings 127 and 129 are prepared from a material having a low co-efficient of thermal expansion. Examples of such a material are nickel-iron alloys and a common trade name for a suitable one of these alloys is "Invar." The compartments 35 and 37 are air tight and are each provided with a small projecting tube 134 and 135. These tubes are fixed rigidly in the wall of the chamber 33. The hollow flexible tube 29 connects the projecting tube 134 with stationary tube 25 of the rotary port seal 19 and the hollow flexible tube 31 connects the projecting tube 135 with stationary tube 27 of the rotary port seal 21. By this arrangement pressure variations induced in the orifices 13 and 15 may be transmitted rapidly and efficiently to compartments 35 and 37, respectively, of chamber 33.

Figure 6:
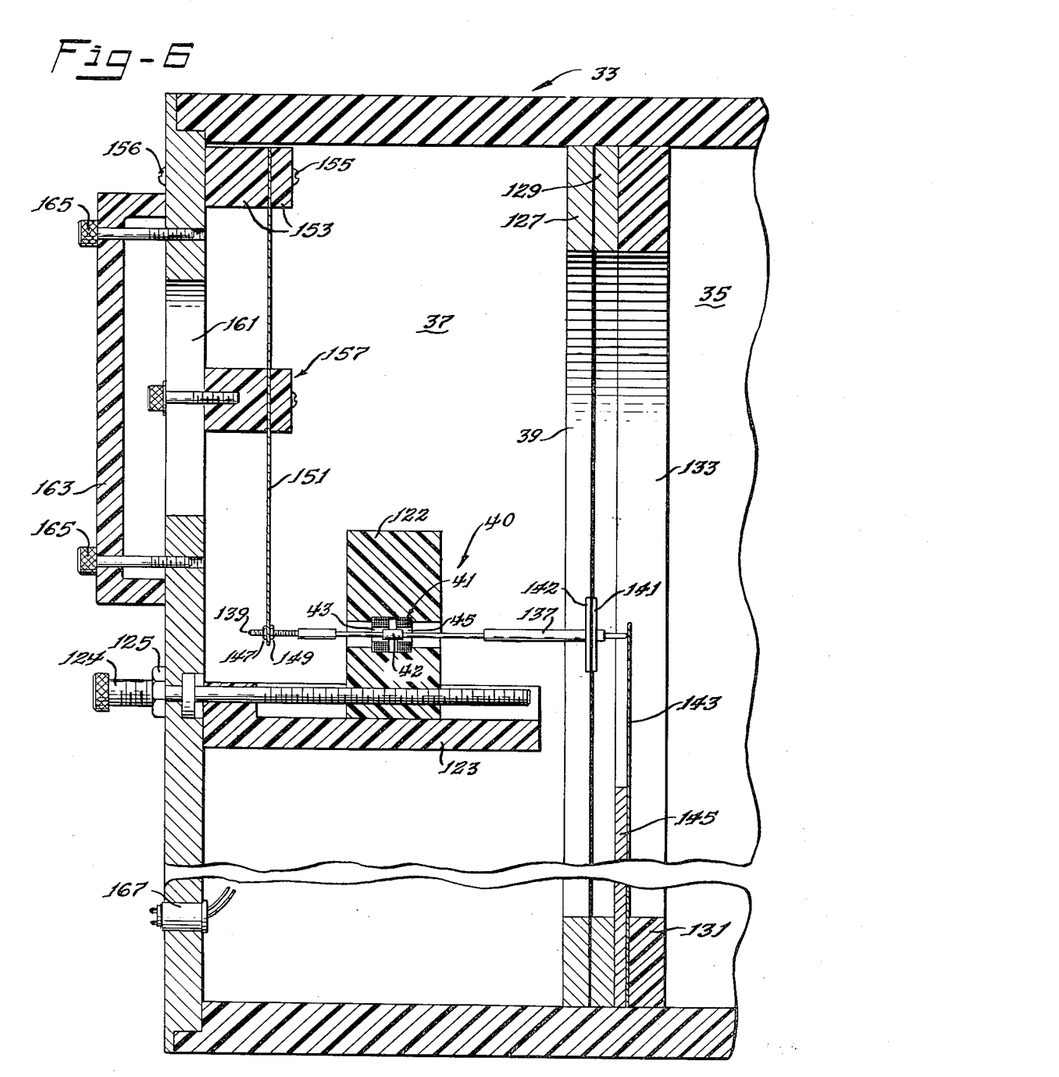
Fig. 6 is a sectional view of the chamber taken on line 6—6 of Fig. 4.

Fig. 6 is a sectional view of the chamber 33, and in particular, illustrates the electro-mechanical transducer 40 whereby movements of the membrane 39 may be readily detected. The sensitive element of the transducer 40 is a linear variable differential transformer 41 which comprises a primary coil 43, a secondary coil 45, and a movable metallic transformer core 42 mounted on a rod 137. The rod 137 is attached to the membrane 39 by means of two disks 141 and 142 which are cemented one to either side of the membrane 39. Rod 137 further extends through the membrane 39 and terminates against a flat spring member 143, which is held rigidly by a bracket 145 to the partition 131 and the ring 129. The other end 139 of the rod 137 is threaded and held by means of two lock nuts 147, 149 to a cantilever mounted flat spring member 151. The spring 151 is held by a bracket 153 and suitable screws 155, 156. Spring 151 is further held by means of an adjustable bracket 157 adapted to move the length of a slot 161 in the wall of the chamber 33 parallel with the spring 151. By varying the position of the brackets 157 the spring constant and the natural vibration period of spring 151 is varied and accordingly the core 42 of transformer 41 may be held either more or less rigidly, and any undesirable resonance characteristics of the instrument may be damped by adjusting the bracket 157. The bracket 157 may be moved in a direction to increase the free length of spring 151 and thereby increase the natural period or moved in a direction to decrease the free length of spring 151 and thereby decrease the natural resonant period of the spring 151, rod 137 and associated parts. In order to preserve the tightness of compartment 37 a removable cover 163 is provided to seal the wall slot 161. Lag screws 165 hold the cover 163 in place over the slot 161. The coils 43 and 45 of the transformer 41 are held by a sliding bracket 122 which is mounted on a supporting member 123, and is adapted to slide on the member 123 and thereby adjust the coils 43 and 45 axially with respect to the transformer core 42 and rod 137. A threaded adjusting screw 124 mechanically coupled to this bracket 122 and rotatably mounted in the wall of chamber 33, is adapted to move the bracket 122 axially with respect to the rod 137. A lock nut 125 threaded onto the adjusting screw 124 is disposed on the exterior of the chamber wall and when tightened thereagainst holds the adjusting screw securely in place. By moving the coils 43, 45 with respect to the core 42 of the transformer 41 the instrument may be readily calibrated for installation of the chamber 33 in any position.

A four-pronged air tight electrical plug 167 is provided in the wall of compartment 37 of the chamber 33. Two of the prongs are connected to the primary coil 43 of the linear differential transformer 41 and two of the prongs are connected to the secondary coil 45.

Figure 7:
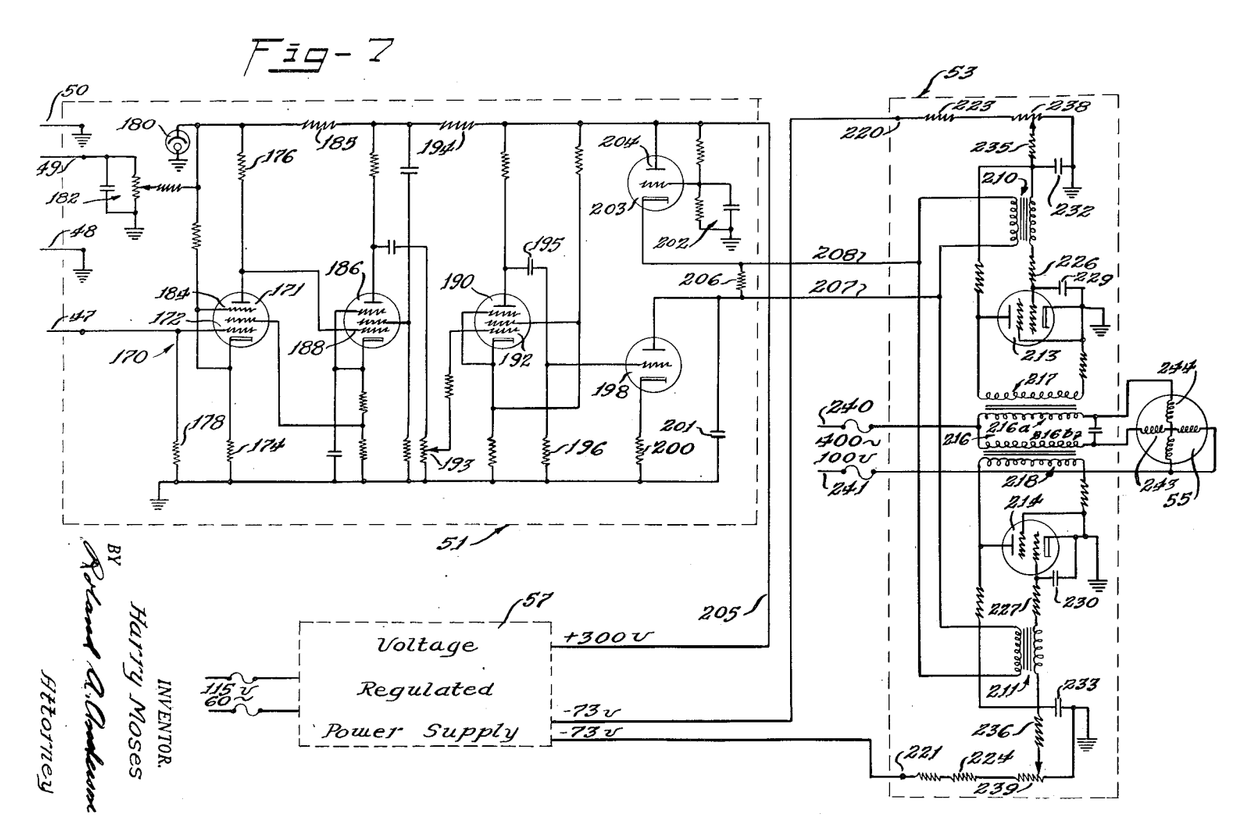
Fig. 7 is a schematic circuit diagram of the voltage amplifier, and servo drive circuit and in addition shows the details of interconnections between the different electronic components.

Fig. 7 is a schematic diagram showing in some detail the circuit of the voltage amplifier 51 and the servo drive circuit 53 as well as the electrical connections between the various component parts of the invention as a whole. The output or secondary coil 45 voltage of the linear variable differential transformer 41 is fed into the input stage 170 of the voltage amplifier 51 via leads 47 and 48. Lead 48 is grounded and lead 47 is connected to the control grid 172 of tube 171. The input stage 170 further comprises a resistor 174 between the cathode of tube 171 and ground, a plate load resistor 176 in the plate circuit, and a grid bias resistor 178. Voltage regulation is provided by a voltage regulating tube 180 connected between the plate circuit and ground. The 400 cycle signal from the A. C. tachometer 46 is fed in phase opposition to the linear differential transformer 41 signal into an R-C network 182 and thence impressed on the suppressor grid 184 of the tube 171. The signal from the tachometer 46 is transmitted to the amplifier 51 by means of leads 49 and 50. Input of the two signals in phase opposition assures electrical damping of signals from the linear variable differential transformer 41. A voltage dropping resistor 185 provides proper plate potential for tube 171 and the second stage tube 186. The output of tube 171 is directly coupled to the grid 188 of tube 186. The output of tube 186 is R-C coupled to the grid 192 of the third stage tube 190. A voltage divider resistor 193 is used as the amplifier gain control. Resistor 194 provides proper plate potential between tubes 186 and 190 and also provides some decoupling between these tubes.

The output of tube 190 is R-C coupled by means of condenser 195 and resistor 196 to the grid of triode tube 198. Resistor 200 provides the cathode bias for tube 198, and condenser 201 serves as a bypass condenser for tube 198. Tube 203 and the R-C network 202 associated with it is a voltage stabilizer for the output signal. The plate 204 of tube 203 is connected directly to the high voltage power source 57. The amplifier 51 is powered by a lead 205 from a conventional 300 volt voltage regulated power supply 57. The amplifier 51 is a voltage amplifier with a maximum gain of $10^6$, and in the present invention the amplifier 51 is employed to increase and control the amplitude of the signal from the linear variable differential transformer 41 and feed the amplified signal into the servomotor control circuit 53. The output of the amplifier is taken from across resistor 206 which is connected directly to the plate and cathode of tubes 198 and 203, respectively.

The servomotor 55 is driven by a servo drive circuit 53 which is essentially an arrangement of four transformers 210, 211 and the double transformer 216, and two power thyratron tubes 213, 214. The output of the voltage amplifier 51 is fed by leads 207 and 208 into the primary sides of transformers 210 and 211. The primary sides of these two transformers are connected in a series circuit in phase opposition. The thyratron tubes 213 and 214 are connected by means of a double transformer 216 having two secondary coils 217 and 218 which are resistance coupled to the control grid of thyratron tubes 213 and 214, respectively. The transformers 210 and 211 provide an A. C. grid bias for the two thyratron tubes 213 and 214, and a D. C. grid bias inserted in the servo drive circuit at terminals 220 and 221, is provided from the regulated voltage power supply 57. The correct grid voltages for the thyratrons are provided by the voltage dropping resistance circuits 223 and 224. Resistors 226 and 227 in combination with condensers 229 and 230 act as integrating circuits and prevent extraneous surges from causing undesired firing of the thyratron tubes 213 and 214. Condensers 232 and 233, together with resistors 235 and 236 act as integrating circuits for a similar purpose. Variable resistors 238 and 239 provide proper bias on the control grids of the thyratron circuits.

When a signal from the output of the voltage amplifier 51 is impressed upon transformers 210 and 211 the phase relationship of the transformers is such that only one of the thyratron tubes 213 and 214 will start conducting, the other will be quiescent. The transformer 216 has two primary coils, 216a and 216b in parallel connection. One side of the 400 cycle 100 volt power main indicated by lead 240 is connected to the two primary coils of transformer 216. The other side of the primary coils 216a and 216b are connected to the servomotor windings 243 and 244. The second side of the 400 cycle 100 volt main is connected by lead 241 directly to the junction of the servomotor windings 243 and 244.

When one thyratron tube, for example tube 213, starts conducting the potential drop across the secondary coil 217 of the transformer 216 will be low, as a consequence the potential drop across the transformer primary 216a will be low and the major part of the 400 cycle voltage of leads 240 and 241 will be placed across the servomotor winding 244. The voltage in winding 244 will be considerably higher than in winding 243 and the phase relationships will be such as to cause rotation of the servomotor 55 in one direction. If the phase of the signal from the voltage amplifier 51 is 180° different from the signal of the example above, the thyratron tube 214 will start conducting, while tube 213 will be quiescent; and in turn the servomotor 55 will be caused to turn in the direction opposite to that of the first example.

The 400 cycle power source 44 and the voltage regulated power supply 57 are conventional power supply circuits and are described in numerous places in the literature. The synchro generator 67 is of conventional design and is adapted to feed a signal into a conventional synchro angular position recorder 71.

Recording means other than the one illustrated for application with the synchro generator are readily adapted for use with the invention. Examples of suitable alternative recording means are a potentiometer and recording galvanometer. Still another means may be readily contrived using a potential divider in combination with a voltmeter or galvanometer.

The instrument is prepared for use by placing the movably mounted member 11 and the components associated therewith, as illustrated in Fig. 2, in a known position in the wind field. The angular position recorder 71, chamber 33, amplifier 51, servo drive circuit 53, and power sources 44 and 57 may be located at a convenient place remote from the member 11.

If the orifices 13 and 15 are positioned asymmetrically with respect to the direction of the wind flow, a pressure difference between them will be induced due to dynamic effects of the air flowing at different oblique angles across these two orifices. The pressure at each orifice 13 and 15 will be transmitted to the sections 73 and 75, respectively, of the tube 72 and in turn through the rotary port seals 19 and 21 through the flexible tubes 29 and 31 to the compartments 35 and 37 in chamber 33. The resulting pressure difference in the two compartments 35 and 37 and across the membrane 39 between the two compartments will distort the membrane 39 and in turn will cause the rod 137 to be moved axially. Any movement in the rod 137 will alter the inductive coupling of the primary coil 43 with the secondary coil 45 of the linear variable differential transformer 41. The rod 137 is held in by springs 143 and 151 so as to eliminate undesirable resonant movements of the rod 137 and membrane 39. Changes in the inductive coupling of the linear variable differential transformer 41 are reflected in the secondary coil 45 transmitted by means of leads 47 and 48 to the voltage amplifier 51. A second signal originating in the 400 cycle A. C. tachometer 46 is fed into the first stage of the voltage amplifier 51 and is used to damp the signal from the transformer 41. The voltage amplifier 51 consists of four amplification stages and a fifth voltage regulating stage. The output of the amplifier is fed into a servomotor drive circuit 53 which is designed to rotate the servomotor 55 in accordance with the instantaneous phase difference between signals from the transformer 41 and signals derived from the 400 cycle power source 44. The servo drive circuit 53 comprises two thyratron tubes with transformers working in phase opposition so that the servomotor is rotated in a direction adapted to rotate the tube 72 and the orifices 13 and 15 into a symmetrical position with respect to the wind direction. The synchro generator 67 is mechanically adapted to respond to movement of the motor shaft and generates a signal directly proportional to the direction and the magnitude of motions of the servomotor shaft. Signals originating in the synchro generator 67 are fed directly into a synchro angular position recorder 71 which continuously records the movements of the shaft of the servomotor 55 and therewith changes in direction of the wind. Wind variations of a frequency of three per second and of an amplitude of less than one mile per hour are readily detected and recorded by this apparatus.

Figure 8:
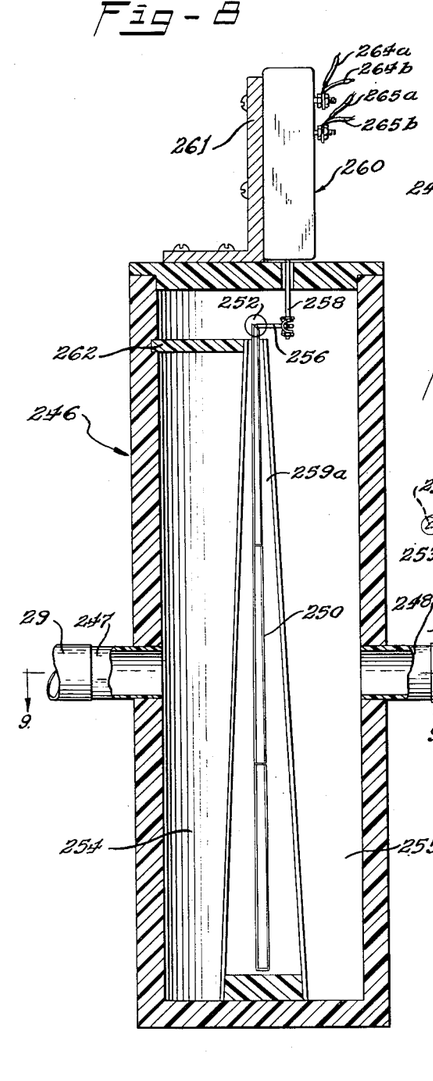
Fig. 8 shows a sectional view of an alternate arrangement for suspending the membrane and an alternate electro-mechanical transducer means.
Figure 9:
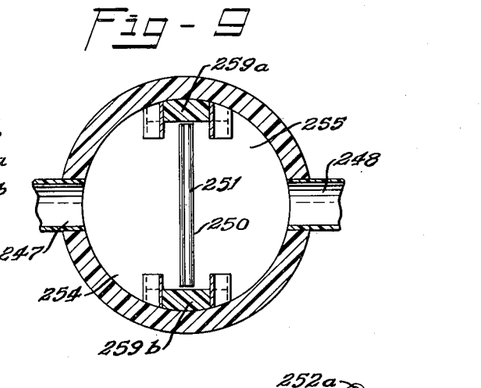
Fig. 9 is a section view of the chamber shown in Fig. 8 viewed from a plane taken on line 9—9.
Figure 10:
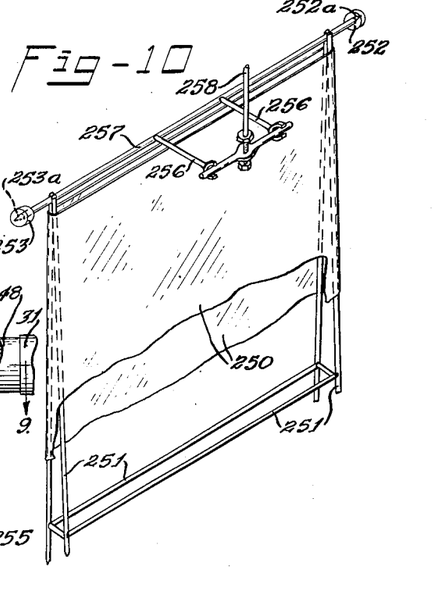
Fig. 10 is a perspective view of the membrane suspension illustrated in Fig. 8.

An alternative method of sensing pressure differences is illustrated in Fig. 8, which shows a sectional view of a chamber 246 which may be substituted directly for chamber 33 and connected to flexible tubes 29 and 31 at fixed tubes 247 and 248. The chamber 246 employs an altogether different electro-mechanical transducer principle although the alternative method of Fig. 8 also depends upon creating a difference in the pressure across a membrane suspended between two compartments of a chamber. The membrane 250 may be made from tightly woven nylon, plastic or rubber and is suspended on a metal wire frame 251 as is illustrated in Fig. 10. The metal wire frame 251 in turn is suspended pendulum-like on bearing points 252a and 253a at its upper corners on bearings 252 and 253. The membrane 250 and the wire frame 251 are in effect a pendulum separating the compartments 254 and 255. The frame is free to rotate through a small angle about the bearings 252 and 253. Fig. 9 is a sectional view of the chamber 246 taken on line 9—9 of Fig. 8 and shows the relationship between the membrane 250 and the wire suspension means 251 with the walls of the chamber 246. Recessed ribs 259a, 259b are positioned along the walls of the chamber 246 between the compartments 254 and 255. The pendulum-suspended membrane 250 separates the two compartments and is restricted to movements through a small angle about the bearings 252 and 253 by the recessed ribs 259a and 259b. Air flow over the top of the membrane 250 between the two compartments 254 and 255 is prevented by means of a horizontal partition 262 inserted in the plane of the bearings 252 and 253. Lever arm 256 extends at right angles to the membrane 250 from the uppermost member 257 of the frame 251. A connecting rod 258 is attached to the end of the lever 256 most remote from the membrane 250 and is attached at its other end to a conventional variable resistance strain gauge 260. The strain gauge 260 is essentially an electrical bridge having variable resistor elements responsive to changes in the loading on the connecting rod 258. The strain gauge is mounted on top of the chamber 246 by means of a bracket 261. Electrical connections are made with the strain gauge through the leads 264a, 264b, and 265a, 265b.

The electronic means by which a signal from the strain gauge is amplified and by which it controls the motion of the servomotor 55 whereby the orifices 13 and 15 may be positioned symmetrically in the wind field is, in its broad outline, similar to that which was described above for adaptation with the linear differential transformer 41. However, because the signal from the strain gauge 260 is a direct current signal in contrast to the signal from the linear variable differential transformer 41 which is an alternating current signal, it is necessary to modify certain details of the electronic circuit.

Figure 11:
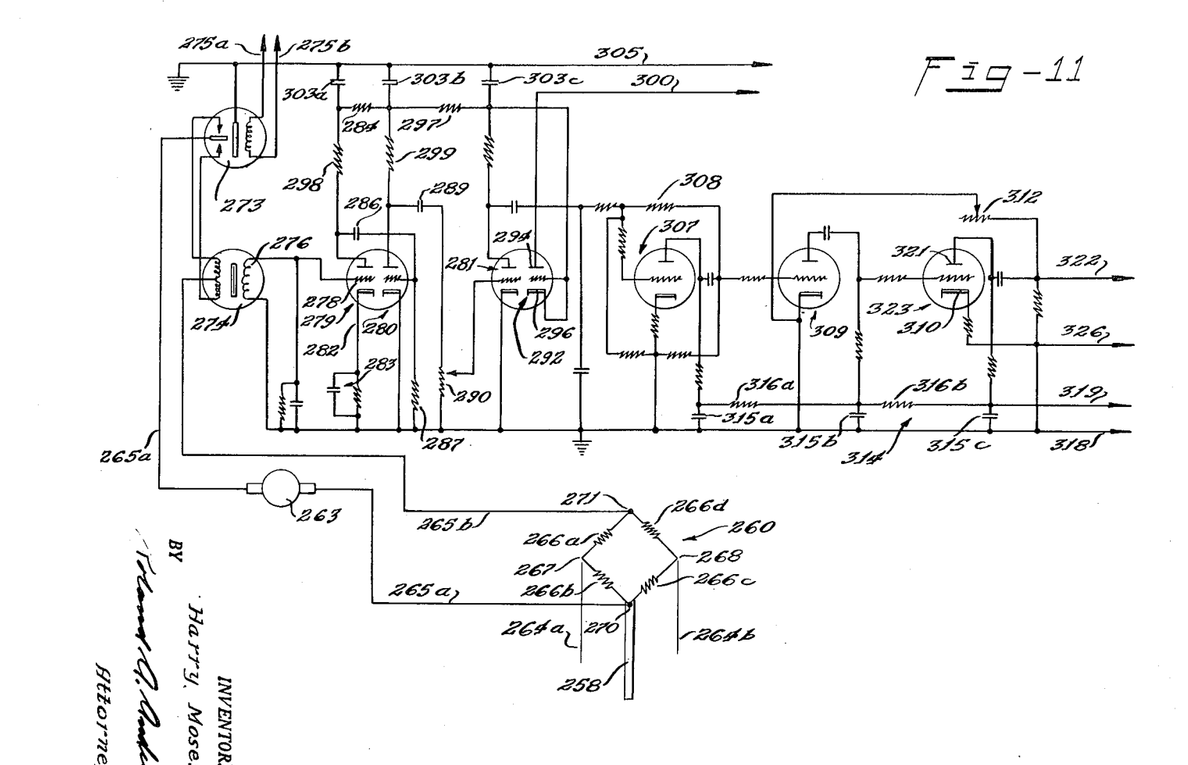
Fig. 11 is a schematic circuit diagram of a converter and voltage amplifier for application with the electro-mechanical transducer means illustrated in Fig. 8.

Fig. 11 is a schematic diagram of the converter means and voltage amplifier for use with the strain gauge electro-mechanical transducer of Fig. 8. The strain gauge 260 is shown schematically in Fig. 11. Such gauges are old in the art and comprise four variable resistors 266a, 266b, 266c, 266d, disposed to form a balanced electrical resistance bridge. D. C. power supply leads 264a and 264b are connected to one set of opposed terminals 267, 268; the strain gauge signal is taken from the terminals 270, 271. The signal is responsive to imbalance in the bridge due to variation in the resistance of one or more of the resistors when the connecting rod 258 imposes a mechanical load on one or more of the variable resistors 266a, 266b, 266c, 266d. When no mechanical load is imposed on the strain gauge 260 through the rod 258 the resistance bridge is balanced and no current flows along either lead 265a or 265b. If the resistance bridge is unbalanced, then a direct current signal flows in leads 265a and 265b, the sign of the current is determined by whether the rod 258 is in tension or compression.

A direct current tachometer 263 responsive to the speed of rotation of the servo motor shaft 61 is connected electrically in series between the strain gauge 260 and a converter 273, described below, by insertion in the lead 265a. The tachometer 263 damps the electrical signal from the strain gauge 260 in proportion to the speed of rotation of the servomotor shaft 61, and constitutes a series compensation feed-back loop which stabilizes the response of the apparatus and reduces overshoot of the servomotor 55. The direct current tachometer 263 is mounted adjacent and directly below the servomotor 55 as illustrated in Fig. 2 for the A. C. tachometer 46 of the first embodiment. The tachometer 263 is also coupled directly to the shaft 61 similarly to the coupling of the tachometer 46 in the first embodiment.

A vibrating reed converter 273 in series with an input transformer 274 converts the D. C. strain gauge signal as modified by the tachometer 263 into an A. C. signal with phase adjusted to lead or lag depending upon the sign of the direct current signal from the strain gauge leads 265a and 265b. Converter leads 275a, 275b are connected to a conventional 6 volt filament power supply. The secondary coil 276 and the input transformer 274 are connected to the grid 278 of the first of three amplifier stages 279, 280, 281. Grid bias for the first stage 279 is provided by the R-C network 283. Plate potential for the first stage is adjusted by the resistor 284. The first stage 279 is R-C coupled to the grid of the second stage 280 by condenser 286; and the second stage 280 is also R-C coupled to the third stage 281 by means of a condenser 289 and a variable resistor 290, which is further utilized for the gain control. The D. C. potential for the first three stages 279, 280, 281 is provided by a half wave rectifier 292. The plate 294 of the half wave rectifier 292 is connected to a lead 300 from the power supply 301. The grid 295 and cathode 296 of the half wave rectifier are connected together and in turn connected to the plate circuits of the first stages 279, 280, 281 through resistors 297, 298, and 299. Condensers 303a, 303b, 303c are connected to the power supply lead 305 and to the plate circuits of the first three stages 279, 280, 281 and constitute a filtering network. Feedback stabilization is provided by resistor 308. The stages of amplification 309 and 310 follow amplification stage 307 and the half wave rectifier stage and each is R-C coupled to the preceding stage. Variable resistor 312 provides feedback stabilization control. A filter circuit 314 comprising condensers 315a, 315b, 315c and resistors 316a and 316b are tied to the plate circuits of the last three stages of amplifications 307, 309 and 310. The filter circuit 314 is tapped by leads 318 and 319. The plate 321 of the last stage of amplification 310 is R-C coupled to a phase inverter by lead 322 and the cathode 323 of the last stage 310 is resistance coupled to the cathodes of a phase inverter stage 325 by lead 326. The phase inverter 325 is the input stage of the servomotor drive circuit 328 which is shown in schematic form in Fig. 12. The servomotor drive circuit 328 comprises a first stage phase inverter 325 followed by a push-pull power amplification stage 330 and a transformer 332. The output signal from the last stage 310 in the amplifier is fed into the grid 327 of one of the phase inverter tubes 325a and the lead 326 from the cathode of the last stage 310 in the amplifier is connected to the common cathode terminals of the phase inverter tubes 325a and 325b. The phase inverter 325c plate circuit is conventional. Lead 318 from the amplifier filter circuit 314 is fed by means of an R-C circuit to the plate circuits of tubes 325a and 325b. The phase inverter stage 325 is resistance coupled to the push-pull amplifier 330 by means of grid leads 331a and 331b terminating on the grids of the tubes 330a and 330b. The plates of the tubes 330a and 330b are directly connected one to either end of the primary coil 334 of the transformer 332. Lead 319 from the amplifier filter circuit 314 is connected to a center tap of the transformer primary coil 334. The servomotor 55 used to position the rotating member 11 is powered by leads 336 and 337 which in turn are connected in phase opposition to the end of the transformer secondary coil 338. The remaining two windings of the motor 55 are connected to the 110 volt power supply 301 by means of leads 339 and 340. The signal of the power supply 301 is phase adjusted by means of a condenser 342.

Figure 12:
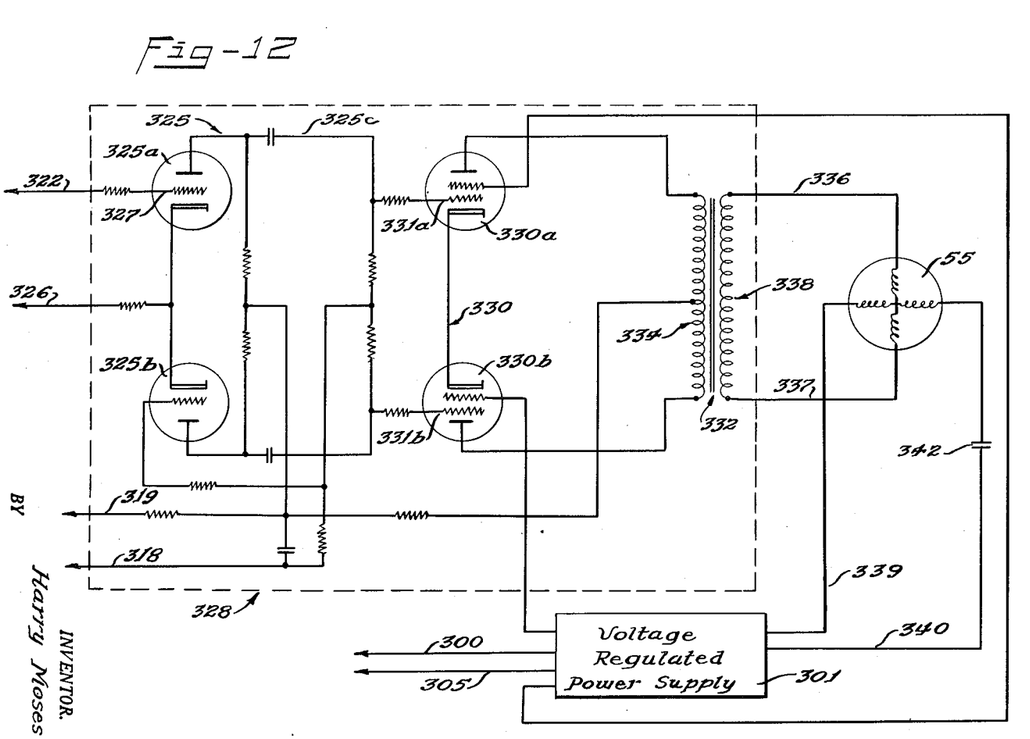
Fig. 12 is a schematic diagram of a servomotor drive circuit for use with the electro-mechanical transducer means illustrated in Fig. 8.

The direction of the rotation of the servomotor shaft 61 is responsive to the polarity of the signal of the strain gauge 260 as modified by the tachometer 263. When the strain gauge is balanced and produces no signal the primary coil 334 of the transformer 332 will pass no current. However, when the strain gauge 260 is unbalanced depending upon the polarity of the strain gauge signal, a current will flow through leads 319 and 322. The motor windings are connected by means of leads 336 and 337 to the secondary coil 338 of the transformer 332. For a given phase angle voltage transmitted by the leads 319 and 322, the motor shaft 61 will be rotated in a given direction and with a reversal of that polarity resulting in a 180° phase shift of the voltage carried by the leads 319 and 322, the transformer 332 will reverse phase and the motor shaft 61 will rotate in the opposite direction.

The present invention is not intended to be limited by the disclosure of the particular embodiments above but is to be limited only by the scope of the following claims.

What is claimed is:

1. An apparatus for indicating the direction of a wind vector comprising a fully rotatably mounted member having two orifices, a stationary chamber, a flexible membrane suspended within the chamber and dividing the chamber into two compartments, means for connecting each orifice to one compartment in the chamber, an electro-mechanical transducer connected to the membrane and generating an electromotive force proportional to the displacement of the membrane, a motor coupled to the member to position the rotatably mounted member, and electronic means connected electrically to the transducer and adapted to actuate the motor, whereby the position of the motor indicates the direction of the wind incident upon the member.

2. An apparatus for sensing direction of air flow comprising, in combination, a rotatably mounted member having a plurality of orifices at right angles to the axis of rotation and having a comparable number of internal air passages, one orifice opening into each internal air passage, a stationary chamber, a flexible portion disposed within the chamber and dividing the chamber into compartments, means for transmitting pressures within the internal air passages to the individual compartments, means for detecting movements of the flexible portion attached thereto, a motor coupled to the rotatably mounted member, electronic means connected to the detecting means and adapted to actuate the rotatably mounted member in response to movements of the partitions, and automatic means coupled to the rotatably mounted member for recording movements of the tube.

3. An apparatus for sensing wind direction comprising a fully rotatably mounted member having two orifices opening at right angles to one another and radially with respect to the axis of rotation of the member, a chamber, a flexible membrane disposed within the chamber dividing the chamber into two compartments, each compartment being connected by conduit means to one orifice, an electro-mechanical transducer coupled to the membrane for sensing movements of the membrane and generating electrical signals in response thereto, a motor coupled to the rotatably mounted member, and electronic means having an input stage connected electrically to the transducer and having an output stage connected electrically to the motor to form a feedback circuit responsive to imbalance in the air pressure on the orifices whereby the rotatably mounted member is rotated to position the orifices symmetrically with respect to wind direction.

4. An apparatus for sensing direction of air flow comprising, in combination, an axially partitioned fully rotatable walled tube having two internal sections and having two orifices in the walls of the tube, each orifice opening into one internal section, a stationary chamber, a flexible membrane positioned within the chamber and dividing the chamber into two compartments, means for transmitting pressures in the internal tube sections to the stationary chamber compartments, means for sensing movement of the membrane coupled thereto, a synchro motor coupled to the tube and adapted to rotate the tube including the orifices to maintain a symmetric relationship of the orifices to the direction of the air flow, electronic means connected to the means for sensing movement, said electronic means responsive to the means for sensing movement of the membrane to actuate the motor, and means for recording movements of the motor and therewith changes in the direction of the air flow about the tube.

5. An apparatus for sensing direction of air flow comprising, in combination, an axially partitioned fully rotatable tube having two internal sections and having two parallel slots in the side of the tube, each slot being connected with one internal section, a rotary pressure seal on the tube, a stationary chamber, a flexible membrane internally positioned within the chamber and dividing the chamber into two compartments, means for sensing movement of the membrane coupled thereto, conduits disposed to connect via the rotary seal each internal section of the tube with one compartment in the chamber, a synchro motor mounted to rotate the tube including the slots to maintain a symmetric relationship of the slots to the direction of the air flow, electronic means having input and output ends, the output being connected electrically to the motor and the input being connected electrically to the means for sensing movement in the membrane, a synchro generator coupled to the tube and adapted to be responsive to the movements thereof, and a recording means connected electrically to the synchro generator whereby asymmetrical orientation of the tube slots with respect to the direction of air flow causes unequal air pressure to develop in the tube sections and in the chamber compartments thereby causing movement of the membrane and initiating an electrical signal in the means for sensing membrane movements, whereupon the electrical signal is fed into the electronic means and in turn activates the synchro motor which repositions the tube symmetrically with respect to the direction of air flow, during which time the synchro generator responds to movements of the motor and activates the recording means.

6. An apparatus for sensing direction of air flow comprising, in combination, an axially partioned fully rotatable tube having two internal sections and having two orifices in the sides of the tube, each orifice being connected with one internal section, a rotary pressure seal on the tube, a stationary chamber, a flexible membrane internally disposed within the chamber and dividing the chamber into two compartments, means for sensing movement of the membrane coupled thereto, conduits disposed to connect via the rotary seal each internal section of the tube with one compartment in the chamber, a synchro motor to rotate the tube coupled thereto, electronic means including a voltage amplifier connected to the sensing means, a synchro motor drive circuit connected to the amplifier and adapted to power the motor with a phase regulated signal responsive to the direction of motion of the membrane, a synchro generator coupled to the tube and adapted to reflect the position thereof, and a recording means connected electrically to the synchro generator whereby asymmetrical orientation of the tube orifices with respect to the direction of air flow causes unequal air pressure to develop in the tube sections and in the chamber compartments thereby causing movement of the membrane and initiating an electrical signal in the means for sensing membrane movements which is fed into the voltage amplifier and into the synchro drive circuit and in turn activates the synchro motor repositioning the tube symmetrically with respect to the direction of air flow, whereupon the synchro generator responds to movements of the motor and activates the recording means.

7. An apparatus for sensing direction of air flow comprising, in combination, an axially partitioned fully rotatable tube having two internal sections and having two orifices in the side of the tube, each orifice being connected with one internal section; seal means disposed about the tube and adapted to transmit pressures from within to without the internal sections without limiting rotatability of the tube, a stationary chamber, a flexible membrane internally disposed within the chamber and dividing the chamber into two compartments, means for sensing movement of the membrane coupled thereto, conduits disposed to connect via the seal means, each internal section of the tube with one compartment in the chamber, a synchro motor having a shaft coupled to the tube, an electronic means connected to the sensing means and adapted to control the motor shaft in direction and angle proportional to the direction and amount of motion of the membrane, a synchro generator coupled to the tube and adapted to be responsive to movements of the motor shaft, and a recording means connected electrically to the synchro generator for indicating position of the tube.

8. An apparatus for sensing direction of air flow comprising, in combination, an axially partitioned fully rotatable tube having two internal sections and having two orifices in the side of the tube, each orifice being connected wtih one internal section, two rotary pressure seals on the tube, a stationary chamber, a flexible membrane internally disposed within the chamber and dividing the chamber into two compartments, means for sensing movement of the membrane coupled thereto, conduits disposed to connect via the rotary seals each internal section of the tube with one compartment in the chamber, a synchro motor coupled to the tube, electronic means connected to the sensing means and adapted to actuate the motor, a synchro generator coupled to the tube and adapted to be responsive to the movements thereof, and a recording means connected electrically to the synchro generator.

9. The apparatus of claim 8 wherein the means for sensing movement of the membrane comprises a linear differential transformer.

10. The apparatus of claim 8 wherein the means for sensing movement of the membrane comprises a linear differential transformer having coils and having a movable core, a rod attached to the mid-region of the membrane with axis disposed at right angles to the plane of the membrane, the movable core being mounted on the rod and disposed adjacent the coils, and mechanical spring means for damping resonate movement of the rod and membrane.

11. The apparatus of claim 8 wherein the means for sensing movement of the membrane is a strain gauge.

12. The apparatus of claim 8 wherein the membrane is suspended on a wire frame mounted as a pendulum, the means for sensing movement of the membrane is a variable resistance strain gauge, and a lever means is fixed to the wire frame and the strain gauge wherewith movements of the frame cause the lever to load the strain gauge.

13. An apparatus for indicating the direction of a wind vector comprising a fully rotatably mounted member having two orifices, a stationary chamber, means disposed in the stationary chamber to provide two compartments, means for connecting each orifice to one compartment in the chamber, means coupled to the disposed means for converting movement thereof into a signal whose amplitude is proportional to the movement, and means coupled to the last means for actuating the member proportionally in response to the amplitude of the signal to maintain a symmetric relationship of the orifices in the wind.

14. The apparatus claimed in claim 13, the means connecting each orifice to one compartment in the chamber comprising two rotary seals, each seal comprising a longitudinal internal section of the rotatably mounted member, a stationary section mounted coaxially with the member and communicating with the interior thereof, movable sections mounted coaxially with the member above and below the stationary section, and fluid means coupling the stationary section with the movable sections to provide a gas-tight seal, and a tube connecting the stationary section to the compartment in the chamber in a gas-tight manner.

15. The apparatus claimed in claim 13, the means connecting the orifices to the compartments in the chamber comprising two rotary seals, each seal comprising a longitudinal internal section of the rotatably mounted member, a sleeve mounted coaxially with the member at a particular level and supported by a stationary member, an annular cavity in the interior of the sleeve having an exterior opening and communicating with an opening in one compartment of the member, the sleeve having an annular groove in its upper portion to form a reservoir for a sealing fluid and an annular projecting section at its lower end, a collar mounted on the member immediately above the sleeve and having an annular section projecting into the reservoir to form a fluid seal, a collar mounted on the member immediately below the sleeve and having an annular groove to form a reservoir and to contain the annular projection whereby a fluid seal is achieved between the interior of the rotatable member and the exterior opening in the stationary sleeve, and a tube connecting the sleeve to a compartment in the chamber in a gas-tight manner.

References Cited in the file of this patent

UNITED STATES PATENTS

| | | |
|---|---|---|
| 2,029,700 | Boykow | Feb. 4, 1936 |
| 2,463,585 | Young | Mar. 8, 1949 |
| 2,513,390 | Young | July 4, 1950 |
| 2,515,251 | Morris | July 18, 1950 |
| 2,701,473 | Fieldgate | Feb. 8, 1955 |